US012801557B2

(12) United States Patent
Narayanan et al.

(10) Patent No.: US 12,801,557 B2
(45) Date of Patent: Nov. 17, 2026

(54) PACKET PROCESSING FOR CLUSTERED CONTAINERS USING AN OFFLOAD ARCHITECTURE

(71) Applicant: Dell Products L.P., Round Rock, TX (US)

(72) Inventors: Padmanabhan Narayanan, Chennai (IN); Kumarapuram Parameswaran Balasubramanian, Chennai (IN); Chitra Raghavan, Chennai (IN); Parameswaran Krishnamurthy, Chennai (IN); Gunasekaran Tamilarasan, Chennai (IN); Anbalagan Natchimuthu, Chennai (IN); Arul Jeniston Maria Cheladurai, Chennai (IN)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 18/779,274

(22) Filed: Jul. 22, 2024

(65) Prior Publication Data

US 2026/0023712 A1 Jan. 22, 2026

(51) Int. Cl.
*G06F 13/42* (2006.01)

(52) U.S. Cl.
CPC ...... *G06F 13/4221* (2013.01); *G06F 2213/28* (2013.01)

(58) Field of Classification Search
CPC .......................... G06F 13/4221; G06F 2213/28
See application file for complete search history.

(56) References Cited

U.S. PATENT DOCUMENTS

2021/0328858 A1* 10/2021 Asveren .............. H04L 61/5007
2022/0345405 A1* 10/2022 Bosshart ............... H04L 49/101
2023/0231827 A1* 7/2023 Tang ................... H04L 12/4641 709/245
2024/0113969 A1* 4/2024 Lin ....................... H04L 45/745
2024/0241728 A1* 7/2024 Gadi ..................... G06F 9/4403
2024/0422107 A1* 12/2024 Sharma ............... H04L 41/0806

OTHER PUBLICATIONS

Infrastructure Networking Infrastructure Application Interface, https://ipdk.io/documentation/Recipes/InfrastructureNetworking/, 2022 (5 pages).

(Continued)

*Primary Examiner* — Henry Tsai
*Assistant Examiner* — Kim T Huynh
(74) *Attorney, Agent, or Firm* — Chamberlain, Hrdlicka, White, Williams & Aughtry; Aly Z. Dossa

(57) ABSTRACT

A method for processing packets, comprising receiving a packet via a representor port on a data processing unit (DPU) operatively connected to a physical host, in response to receiving the packet, processing packet using a hardware switch pipeline in the DPU, where the processing the packet comprises using a plurality of match/action tables to identify an exact match flow entry for the packet, where the plurality of match/action tables do not contain any match flow entries that are not exact match flow entries; and initiating transmission of the packet towards its intended destination using the exact match flow entry.

20 Claims, 9 Drawing Sheets

(56) References Cited

OTHER PUBLICATIONS

Aanand Ramachandran, Integrating Azure CNI and Calico: A technical deep dive, https://azure.microsoft.com/en-us/blog/integrating-azure-cni-and-calico-a-technical-deep-dive/, (6 pages), May 30, 2019.
Balaji Sigamani, K8s Networking and Calico CNI Plugin, https://medium.com/@BalajiSA/k8s-networking-and-calico-cni-plugin-7ebf84bf7fec, (12 pages), Jul. 30, 2022.
Nabil Bitar et al., Kubernetes Networking Infrastructure Offload, Building for the Road Ahead Detroit 2022, (38 pages), Oct. 28, 2022.
Oleg Saprykin, Calico for Kubernetes networking: the basics & examples, https://blog.palark.com/calico-for-kubernetes-networking-the-basics-examples/, last accessed on Jul. 30, 2024. (14 pages).

* cited by examiner

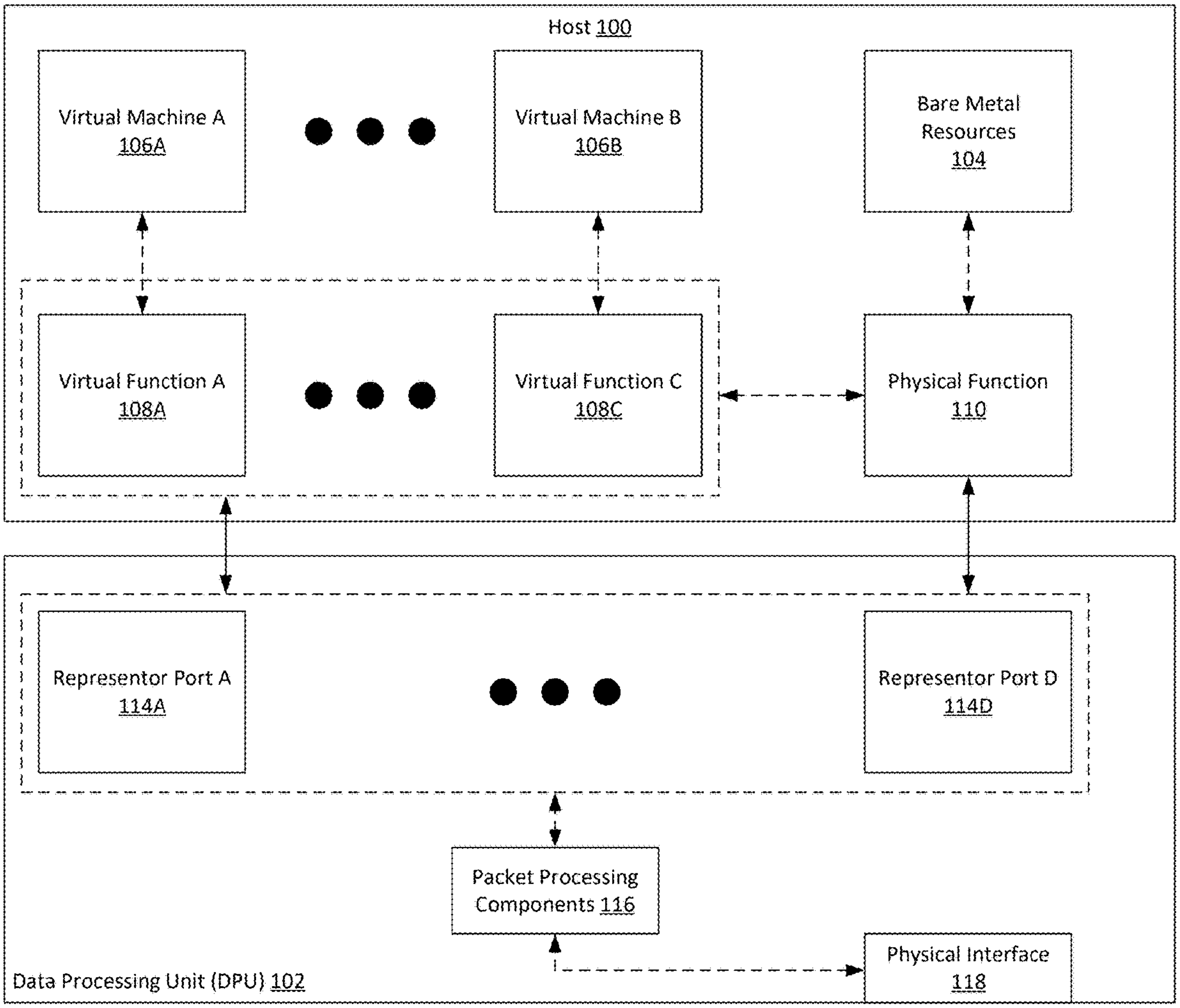
FIG. 1.1

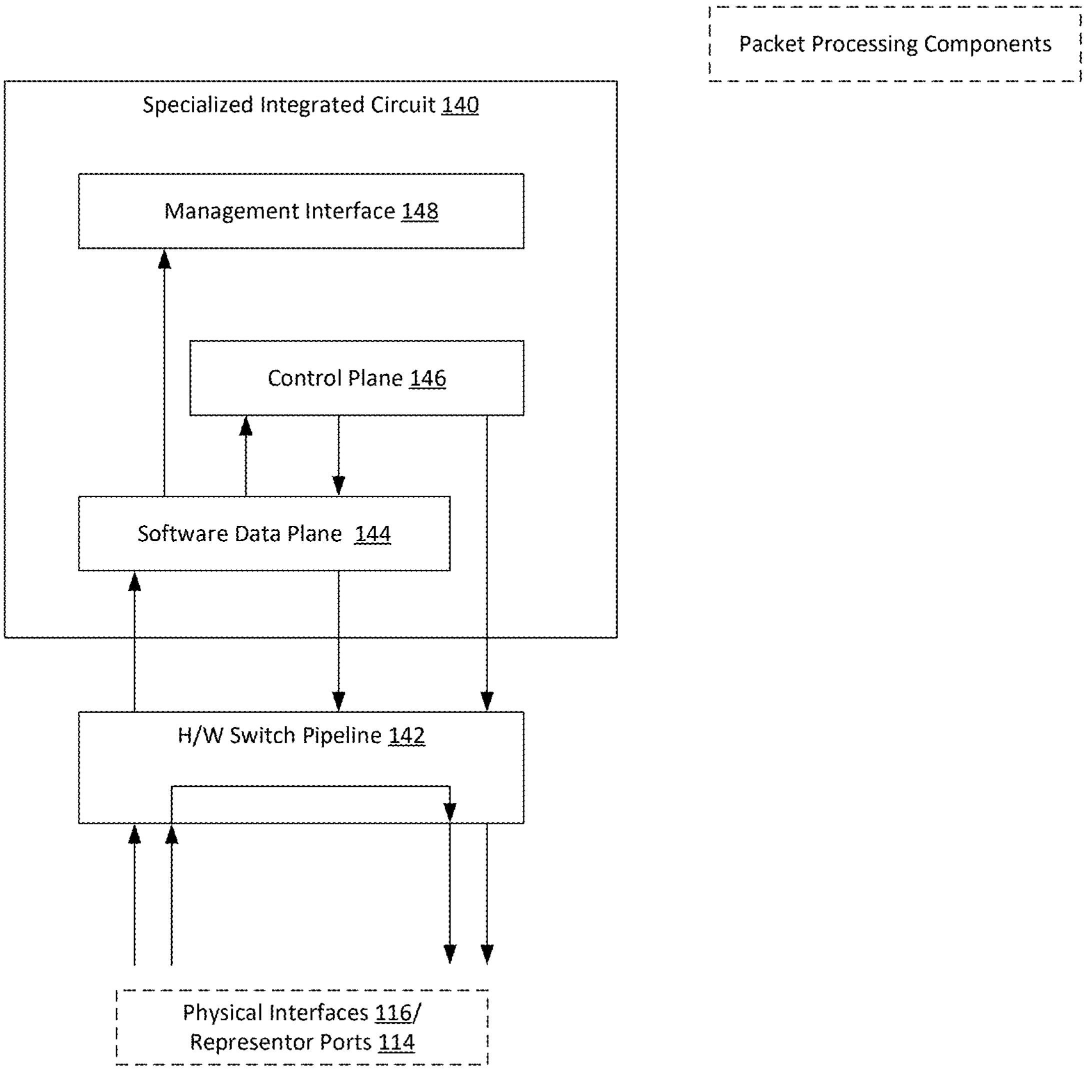
FIG. 1.2

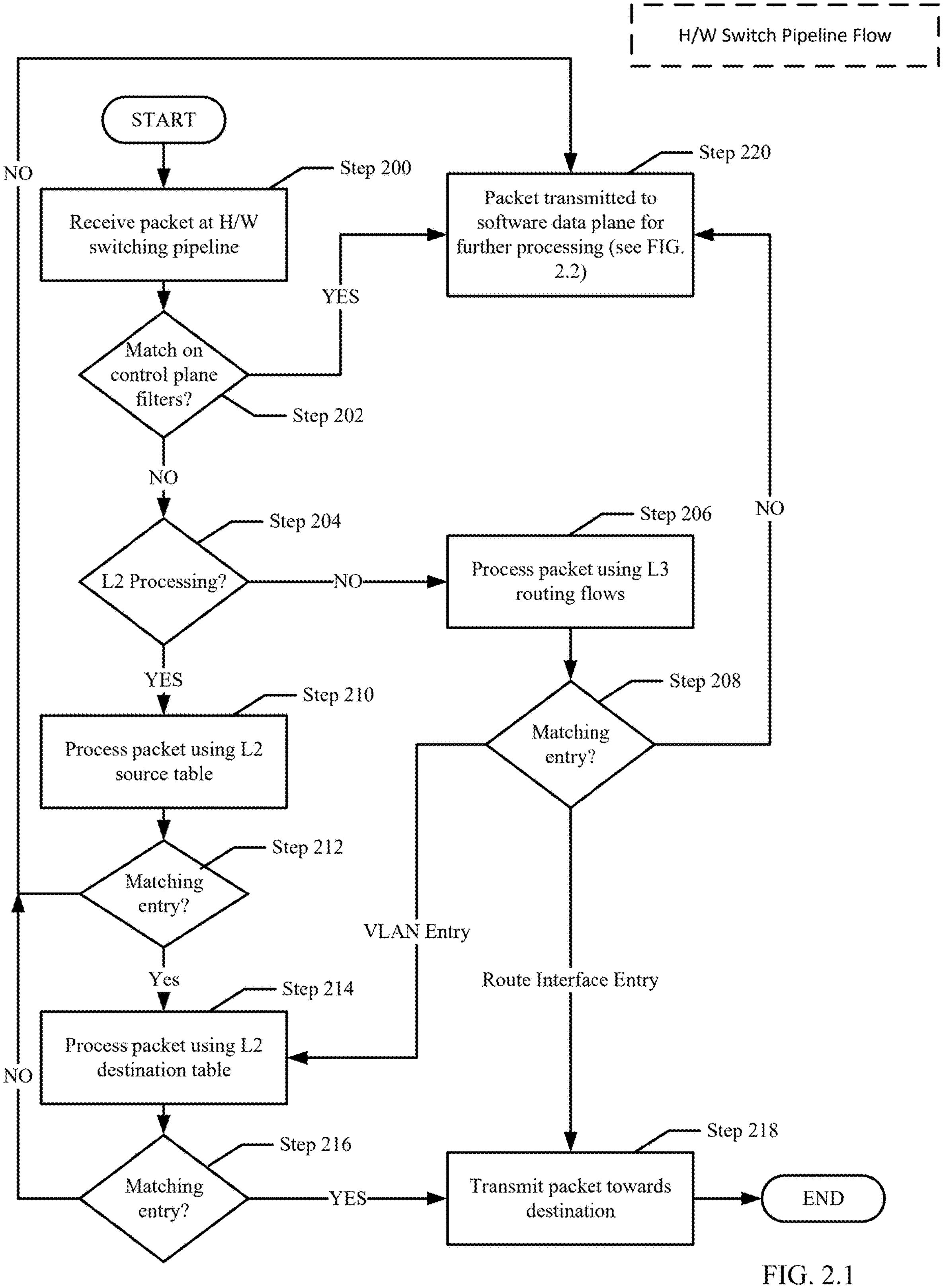
FIG. 2.1

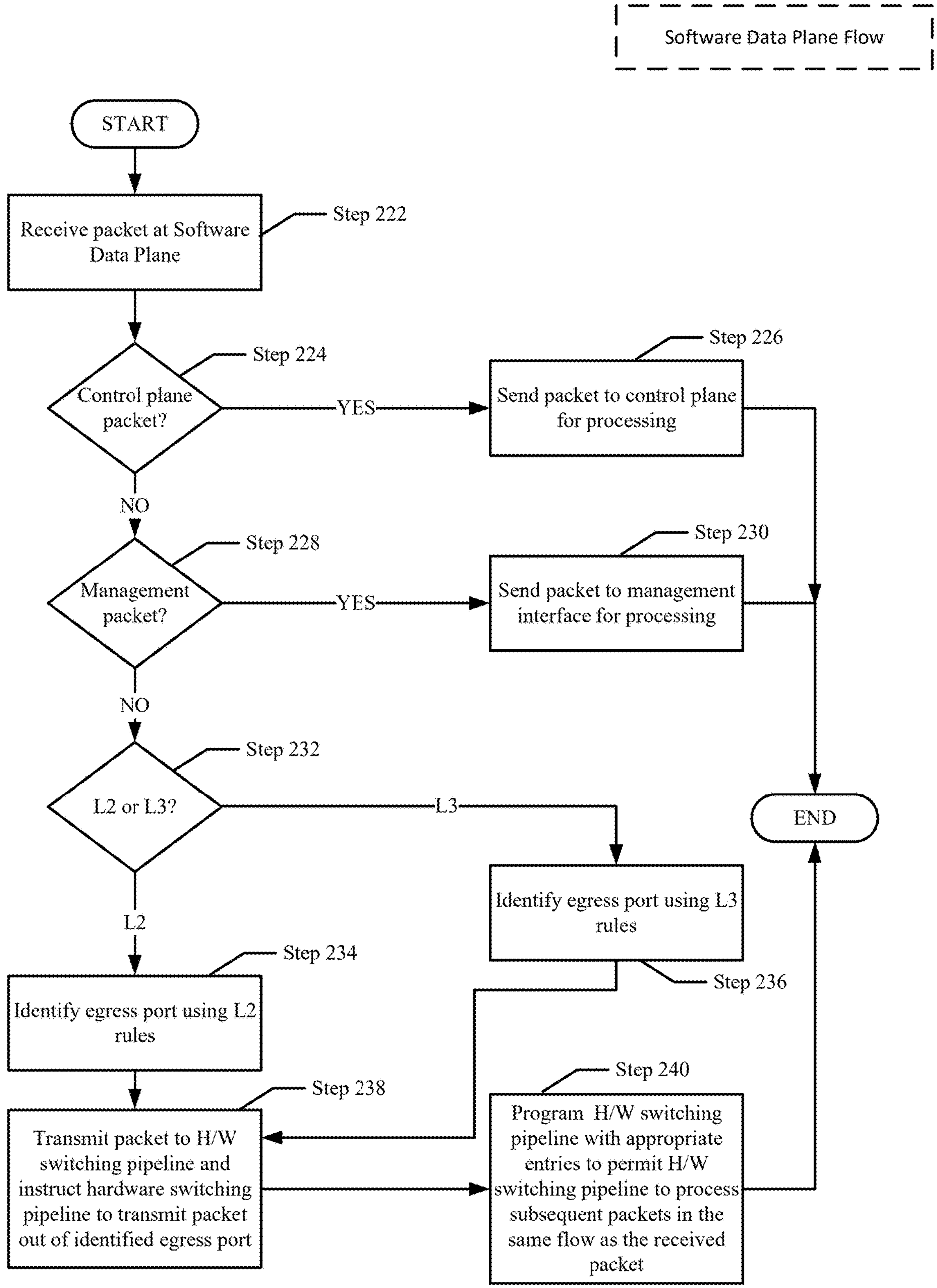
FIG. 2.2

PACKET PROCESSING FOR CLUSTERED CONTAINERS USING AN OFFLOAD ARCHITECTURE

BACKGROUND

Applications generate and transmit large amounts of data, in the form of packets, to other applications. The manner in which the packets are processed by the systems upon which the applications execute has an impact on the performance of the applications.

BRIEF DESCRIPTION OF DRAWINGS

FIG. 1.1 shows a diagram of a system in accordance with one or more embodiments of the invention.

FIG. 1.2 shows a diagram of packet processing components in accordance with one or more embodiments of the invention.

FIG. 2.1 shows a flowchart of a method for processing packets by a hardware switch pipeline in accordance with one or more embodiments of the invention.

FIG. 2.2 shows a flowchart of a method for processing packets by a software data plane in accordance with one or more embodiments of the invention.

DETAILED DESCRIPTION

Figure 3:
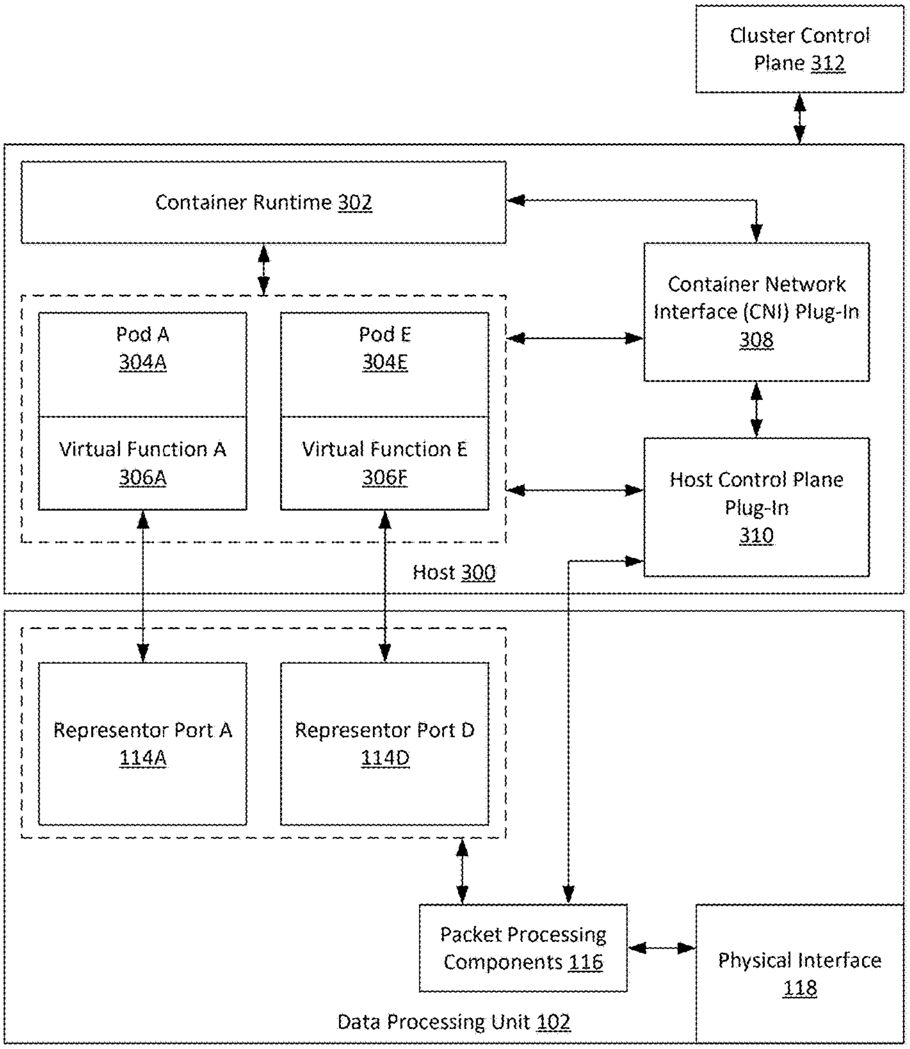
FIG. 3 shows a diagram of a cluster system in accordance with one or more embodiments of the invention.

Traditional packet processing is performed using a clearly defined control plane/data plane model. The processors (e.g., the central processing unit (CPU)) executes control plane protocols (e.g., Border Gateway Protocol (BGP)) to generate a series of routes. These routes are subsequently programmed into vendor specific application-specific integrated circuits (ASICs)) on the system, where the ASICs correspond to the hardware data plane of the system. Within the ASICs, the routes are programmed into fixed ternary content-addressable memory (TCAM) based hardware tables, which are proprietary and unique to the vendors of the ASICs.

In general, embodiments of the invention relate to offloading both the control plane and the data plane to a data processing unit (DPU). More specifically, embodiments of the invention utilize the DPU to implement a control plane, a software data plane, and a hardware switch pipeline (which is programmed by the software data plane) (see e.g., FIG. 1.1). In addition, embodiments of the invention implement the hardware switch pipeline using only exact match flow entries, which are only programmed into the hardware switch pipeline after a packet associated with the flow has been received. In this manner, the hardware switch pipeline emphasizes liveliness in the network traffic (i.e., favors the programming of exact match flow entries corresponds to packets that have been received). To minimize the latency of processing packets in the software data plane (i.e., the processing of the first packet received for a given flow), the software data plane implements vector packet processing (VPP). VPP processes packets in a manner that results in very low latency and high throughput.

In addition to utilizing VPP to minimize latency with the packet processing, the hardware switch pipeline is implemented using content accessible memory (CAM). More specifically, in various embodiments of the invention, after the first packet in a flow is received and processed by the software data pipeline, an exact match flow entry is programmed into the CAM. The CAM is structured as a series of match/action table (also referred to as CAM tables) (see e.g., FIG. 2.2) that are programmed with only exact match flow entries (e.g., /32 routes). While traditional networking utilizes exact matching for L2 processing (i.e., packet forwarding), embodiments of the invention utilize exact matching (i.e., in the form on /32 routes) for L3 processing (i.e., packet routing) as well. Thus, both the L2 and L3 processing are implemented using exact match flow entries within a series of match/action tables. By utilizing only /32 routes for L3 processing, the /32 routes may be programmed within the CAM without requiring any reordering of prior saved routes. In contrast, traditional networking utilizes TCAMs and all types of routes (i.e., /8 routes, /16 routes, /24 routes, etc.), which requires reordering of routes within the TCAM when routes are added and/or removed from the TCAM. The reordering is required so that the TCAMs can implement the longest prefix match in order to perform L3 processing. In instant invention, embodiments do not need to implement the longest prefix match for L3 processing; rather, for a packet that is to be routed, the hardware switch pipeline only has to determine whether or not there is an exact match (i.e., a previously programed /32 route). If there is not an exact match, the hardware switch pipeline sends the packet to the software data plane for processing.

Systems implementing one or more embodiments of the aforementioned offload architecture have seen processing by the CPUs in the systems decrease by 20-40% (depending on the workload of the system). Further, these systems have also been able to program 450K routes in the CAM using the above referenced offload architecture in approximately 52 seconds.

FIG. 1.1 shows a diagram of a system in accordance with one or more embodiments of the invention. In one embodiment of the invention, system shown in FIG. 1.1 includes a host (100) and a data processing unit (DPU) (102). Each of these components is described below. In one embodiment of the invention, the host (100) is operatively connected to the DPU (102) using a Peripheral Component Interconnect express (PCIe) connection(s) (not shown). In one or more embodiments of the invention, the system (or one or more components therein) is configured to perform all, or a portion, of the functionality described in FIGS. 2.1 and 2.2.

In one or more embodiments disclosed herein, the host (100) may be a physical device, such as a computing system (e.g., 700, FIG. 7) as discussed below in more detail in FIG. 7. The host (100) includes bare metal resources (104). The bare metal resources (104) corresponds to the hardware resources in the host (100), e.g., processors, volatile storage (e.g., memory), non-volatile storage (e.g., disk drives, solid state drives, etc.). Applications and other processes, e.g., virtual machines (106A, 106B), execute on the bare metal resources (104) to perform various functions described through this application.

In one or more embodiments, the virtual machines (106A, 106B) correspond to isolated execution environments on the host (100). More specifically, each virtual machine (106A, 106B) includes its own instance of an operating system that accesses the bare metal resources (104) (via a hypervisor (not shown)) executing on the host (100)). The virtual machines (106A, 106B) and the bare metal resources (104) interact with the DPU (102) via a PCIe connection(s). More specifically, the host (100) includes a physical function (PF) (110) and virtual functions (VFs) (108A, 108C). The PF and VFs enable the virtual machines and the bare metal resources to transfer packets to, and receive packets from, the DPU (see e.g., FIGS. 1.1, 1.2, 3, and 5).

As discussed above, the DPU (102) communicates with the host (100) via a PCIe connection(s). More specifically, the DPU, in one embodiment of the invention, supports single root I/O virtualization (SR-IOV), which is an extension of the PCIe specification. SR-IOV enables the DPU to separate access to its resources via different functions—i.e., the PF and the VFs. The PF advertises the DPU's SR-IOV capabilities. The PF is associated with the hypervisor partition (not shown) on the host (100). The VFs each share one or more physical resources of the DPU, such as a memory and a physical interface (118), with the PF and other VFs. Each of the PF and the VFs is mapped to a representor port (114A, 114D) on the DPU (102). This mapping, as is further described below, allows the components on the host (100) (via the PF and VFs) to interact with the DPU.

In one or more embodiments of the invention, the DPU (102) includes a specialized integrated circuit (see e.g., FIG. 1.2, 140), a physical interface (118), packet processing components (116), and representor ports (e.g., 114A, 114D). Each of these components is described below.

In one embodiment of the invention, the specialized integrated circuit (140) may be implemented using a Complex Instruction Set (CISC) Architecture or a Reduced Instruction Set (RISC) Architecture and may include multiple cores. Additional detail about the specialized integrated circuit is provided in FIG. 1.2.

In one embodiment of the invention, the representor ports (114A, 114D) are interfaces on the DPU (102), which enable components on the host (100) to access one or more components on the DPU (102).

In one embodiment of the invention, the packet processing components (116) include a combination of hardware components and software components that are used to process packets received by the DPU, where the packets may be received from the host (100) or from the physical interface (118). Additional detailed about the packet processing components is described in FIG. 1.2.

In one embodiment of the invention, the physical interface (118) is a network interface over which packets are received and/or transmitted. The physical interface may include one or more ports (also referred to as egress interfaces) through which packets may be received or transmitted. Though not shown in FIG. 1.1, the DPU may include memory (e.g., RAM) and non-volatile storage (e.g., CAM) (described below).

While the host (100) and the DPU (102) have been illustrated and described as including a limited number of specific components, the host (100) and the DPU (102) may include additional, fewer, and/or different components without departing from the scope of the embodiments disclosed herein.

FIG. 1.2 shows a diagram of packet processing components (116) in accordance with one or more embodiments of the invention. The packet processing components include the hardware (H/W) switch pipeline (142), the software data plane (144), the control plane (146), and the management interface (148). The software data plane (144), the control plane (146), and the management interface (148) execute on the specialized integrated circuit (140). Each of these components is described below.

In one embodiment of the invention, the hardware switch pipeline (142) is implemented using the content accessible memory (CAM) (as opposed to TCAMs). Because embodiments of the invention utilize only exact match flow entries (as opposed to also supporting non-exact match flow entries), CAM is preferred over TCAM as CAM is optimized for exact match type implementations.

Continuing with the discussion of the CAM, the CAM may be organized into a series of match/action tables, where the match/action tables are organized into a hierarchical table structure to implement the method shown in FIG. 2.1. The CAM may support both L2 entries, which are used to forward packets and L3 routes, which used to route packets. Unlike traditional networking where the L3 routes may include various levels of specificity, e.g., /8 routes, /16 routes, and /24 routes, the L3 routes in the CAM are only /32 routes. Said another way, the L3 routes have a bit mask of 255.255.255.255. Thus, each L3 route is associated with a specific IP address and/or specific destination.

In one embodiment of the invention, the CAM in the DPU is able to support up to 2 million entries (i.e., a combination of L2 and L3 routes).

The hardware switch pipeline (142) is programmed with exact match flow entries in accordance with the method shown in FIG. 2.2. Once an exact match flow entry is programmed into the hardware switch pipeline, a countdown timer is started. The countdown timer is set to a pre-determined period of time and re-starts each time a packet associated with the exact match flow entry is processed by the hardware switch pipeline. However, when no packets associated with the exact match flow entry are processed within the pre-determined period of time (e.g., 3 seconds), then the exact match flow entry is removed from the hardware switch pipeline.

In one embodiment of the invention, by using CAM in combination with only exact match flow entries, the programming and removal of exact match flow entries does not require the re-ordering of other exact match flow entries in the CAM. By contrast, in traditional networking, the TCAM has be programmed in a specific manner in order to support the longest prefix matching and the entries in the TCAM must be reordered when new routes are programmed and/or removed from the TCAM. Because embodiments of the invention do not require re-ordering of the entries in the CAM, the CAM can be used to implement just-in-time programming of entries along with the automated removal of entries associated with a flow for which no packets are received without incurring any reordering overhead.

In one embodiment of the invention, the software data plane (144) executes on the specialized integrated circuit and including functionality to: (i) implement vector packet processing (VPP) to classify the packets received from the hardware switch pipeline (142), (ii) implement the method shown in FIG. 2.2, and (iii) maintain a forwarding information base (FIB).

The FIB (not shown) includes a subset of routes (stored as FIB entries) that are generated by the control plane (discussed above). The routes (which may include routes other than /32 routes) are used to route packets received by the software data plane. The routing of packets is further described with respect to FIG. 2.2. The FIB may be implemented in memory (not shown) that is operatively connected to the specialized integrated circuit. The memory may reside on the DPU or be operatively connected to the DPU.

In one embodiment of the invention, the control plane (146) executes on the specialized integrated circuit and includes functionality to implement networking control plane protocols (e.g., RIP, BGP, OSPF, ICMP, SNMP, MPLS, etc.) in order to generate routes (which may include routes other than /32 routes) and then store such routes (as route entries or RIB entries) in a Routing Information Base (RIB) (not shown). The RIB includes all the routes generated by the control plane, while the FIB only includes a subset of routes from the RIB. Further, for context, the hardware switch pipeline only includes a subset of the routes that are present in the FIB.

In one embodiment of the invention, the management interface (148) is configured to receive management packets from the software data plane (based on the classification using VPP) and process such packets.

While the packet processing components have been illustrated and described as including a limited number of specific components, the packet processing components may include additional, fewer, and/or different components without departing from the scope of the embodiments disclosed herein.

FIG. 2.1 shows a flowchart of a method for processing packets by a hardware switch pipeline in accordance with one or more embodiments of the invention. All or a portion of the method shown in FIG. 2.1 may be performed by the hardware switch pipeline. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 200, a packet is received by the hardware switch pipeline. The packet may be received via a representor (e.g., 114A, 114D) or from the physical interface (118).

In step 202, a determination is made about whether there is a match on the control plane filters, i.e., is the packet associated with a control plane protocol. If there is a match on the control plane filter, the process proceeds to step 220; otherwise the process proceeds to step 204.

In step 204, a determination is made whether the packet should be processed using L2 processing (i.e., should the packet be forwarded (as opposed to routed)). If the packet is to be processed using L2 processing, the processed proceed to step 210; however, prior to proceeding to step 210, the packet is tagged with an appropriate virtual local area network (VLAN) tag (using pre-configured VLAN rules), which is then used to enable the appropriate matching in step 212 and step 214. If the packet is not to be processed using L2 processing, then the process proceeds to step 206.

The initial processing steps 202 and 204 may be performed using a System Flow table in the CAM. Thought not shown in FIG. 2.1, the System Flow table may also include entries corresponding to firewall rules, where packets matching the firewall rules are dropped (i.e., are not processed).

Continuing with the discussion of FIG. 2.1, in step 206, the packet is processed using L3 routing flows (i.e., exact match flow entries) in an L3 table within the CAM. Because the CAM is implemented using only exact match flow entries, if there is not an exact match flow entry for the packet (i.e., an entry in which the destination IP address in the packet matches an L3 routing flow in the L3 table), the process proceeds to step 220.

If there is a matching entry, then the process proceeds to step 214 or step 218. The process proceeds to step 214 when the egress interface in the L3 routing entry corresponds to a VLAN interface (i.e., the entry is a VLAN entry). The process proceeds to step 218 when the egress interface is a routed interface (i.e., a physical port that can route IP traffic to another device).

In step 208, if a determination is made that there is no match, the process proceeds to step 220; however, if there is a matching entry corresponding to a routed interface, then the process proceeds to step 218 and if the matching entry corresponds to a VLAN entry, then the process proceeds to step 214.

Returning to step 204, when the packet is to be processed using L2 processing, then in step 210, the packet is processed using a L2 Source table in the CAM. The processing in the L2 Source table attempts to find an entry that matches the Source Media Access Control (MAC) address in the packet.

In step 212, because the CAM is implemented using only exact match flow entries, if there is not an exact match flow entry for the packet, the process proceeds to step 220. However, if there is a matching entry, then processing proceeds to step 214.

In step 214, the packet is processed using a L2 Destination table in the CAM. The processing in the L2 Destination table attempts to find an entry that matches the Destination Media Access Control (MAC) address in the packet. The L2 Destination table is used to process packets that arrive via step 208 and step 212.

Continuing with the discussion of FIG. 2.1, in step 216, because the CAM is implemented using only exact match flow entries, if there is not an exact match flow entry for the packet, the process proceeds to step 220. However, if there is a matching entry, then processing proceeds to step 218.

In step 218, the packet is transmitted out of the egress interface that is identified in the matching entry from the L3 table or the L2 Destination table. The egress interface may be an egress interface on the physical interface or the egress interface may be a representor port if the packet is destined for an application executing on the host.

If at any point in the packet processing by the hardware switch pipeline there is not a match, then the processing proceeds to step 220. In step 220, the packet is transmitted (or otherwise provided) to the software data plane for further processing (see e.g., FIG. 2.2).

FIG. 2.2 shows a flowchart of a method for processing packets by a software data plane in accordance with one or more embodiments of the invention. All or a portion of the method shown in FIG. 2.2 may be performed by the software data pipeline. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 222, a packet is received from the hardware switch pipeline (via step 220 in FIG. 2.1) by the software data plane.

The software data plane performs a classification of the packet using, e.g., vector packet processing (VPP), in order to determine the type of packet, e.g., whether the packet is a control plane packet (step 224), a management packet (step 228), or an L2 or L3 packet (step 232).

In step 224, if the packet is a control plane packet (e.g., a packet comprising a BGP message), the process proceeds to step 226.

In step 226, the packet is sent from the software data plane to the control plane, where the control plane subsequently processes the packet (as discussed above).

In step 228, if the packet is a management packet, the process proceeds to step 230.

In step 230, the packet is sent from the software data plane to the management interface, where the management interface subsequently processes the packet.

In step 232, if the packet is a data packet that requires L2 processing, the process proceeds to step 234; however, if the packet is a data packet that requires L3 processing the packet is sent to step 236.

In step 234, an egress port (also referred to as an egress interface) for the packet is determined using the L2 rules (i.e., L2 forwarding rules).

In step 236, an egress port for the packet is determined using the L3 route rules and the FIB.

In step 238, the packet is then reinjected back to the hardware switch pipeline with instructions to transmit the packet out of the identified egress port (i.e., the egress port identified in step 234 or 236).

In step 240, the software data pipeline then initiates the programming of the hardware switch pipeline using an exact match flow entry based on processing the occurred in step 234 or 238. The programming of the exact match flow entry may include adding entries to one or more of the following tables in the CAM: System Flow table, L2 Source table, L2 Destination table, and L3 table.

Processing Packets in a Cluster Architecture

In one or more embodiments of the invention, systems include containers. The containers provide isolated environments in which applications can execute. The containers may be grouped into pods (i.e., a group of containers), where each pod (as opposed to each container) is assigned networking resources. Traditionally, the processor (e.g., a CPU) on the host (see e.g., FIG. 3) performs the packet processing for the pods. Embodiments of the invention provide a mechanism to associate each of the pods with a virtual function (e.g., a single root I/O virtualization (SR-IOV) interface). The virtual function is then mapped to a representor port (which is an interface exposed by the DPU). This mapping allows the packet processing of the pod to be offloaded to the DPU. Said another way, by utilizing the virtual function, packets from the pods are directly transmitted to the DPU, thereby not requiring the CPU to process the packets (or substantially decreasing the load on the CPU). Systems with pods implementing various embodiments of invention have experienced decreases in CPU load by 20-30%.

FIG. 3 shows a diagram of a cluster system in accordance with one or more embodiments of the invention. In the following discussion, similarly named parts shown in FIG. 3 have all of the same properties and functionalities as described above in FIG. 1.1. Accordingly, only additional properties and functionalities are described below.

The system shown in FIG. 3 includes a host (300) and a DPU (102), which communicate via a PCIe connection(s). The host (300) includes substantially the same functionality as the host (100) shown in FIG. 1.1. Further, the host (300) includes a container runtime (302), a container network interface (CNI) plug-in (308), a host control plane plug-in (310), and one or more pods (304A, 304E). Each of these components is described below.

In one or more embodiments of the invention, the system further includes a cluster control plane (312), which is configured to manage the cluster. In the system, the cluster corresponds to a set of containers (not shown), where the containers are grouped into pods (e.g., 304A, 304E).

In one or more embodiments of the invention, a container is software executing on the host. The container may be an independent software instance that executes within a larger container management software instance (not shown) (e.g., Docker®, Kubernetes®). In embodiments in which the container is executing as an isolated software instance, the container may establish a semi-isolated virtual environment, inside the container, in which to execute one or more applications.

In one embodiment of the invention, a container may be executing in "user space" (e.g., a layer of the software that utilizes low-level system components for the execution of applications) of the operating system (OS) of the host (300).

In one or more embodiments of the invention, the container includes one or more applications. An application is software executing within the container that may include instructions which, when executed by a processor(s) (not shown) (in the hardware of the host) to initiate the performance of one or more operations, e.g., the sending or receiving of packets.

Each of the pods (304A, 304E) is associated with a virtual function (e.g., 306A, 306F), which include substantially the same functionality as the virtual functions described in FIG. 1.1 (e.g., 108A, 108C).

In one or more embodiments of the invention, a container network interface (CNI) plug-in (308) is configured to manage the network configuration of the pods, where each pod (as opposed to each container) is associated with a set of network resources (e.g., assignment of an Internet Protocol (IP) address)). In one embodiment of the invention, the CNI plug-in delegates the network configuration of the pods to the host control plane plug-in (310). The host control plane plug-in (310) assigns a virtual function to each of the pods. In this manner, the pods (or more specifically, the containers within the pods) can directly access the resources of the DPU (namely the packet processing components). Further, the host control plane plug-in includes functionality to determine an appropriate configuration for the VPP and then provide this configuration to the software data plane (i.e., program the software data plane) in the DPU.

Continuing with the discussion of the host's components, in one or more embodiments of the invention, the container runtime (302) manages the creation of the pods and the containers therein. Further, the container runtime initiates execution of the CNI plug-in (308).

While the host (300) and the DPU (102) have been illustrated and described as including a limited number of specific components, the host (300) and the DPU (102) may include additional, fewer, and/or different components without departing from the scope of the embodiments disclosed herein.

Figure 4:
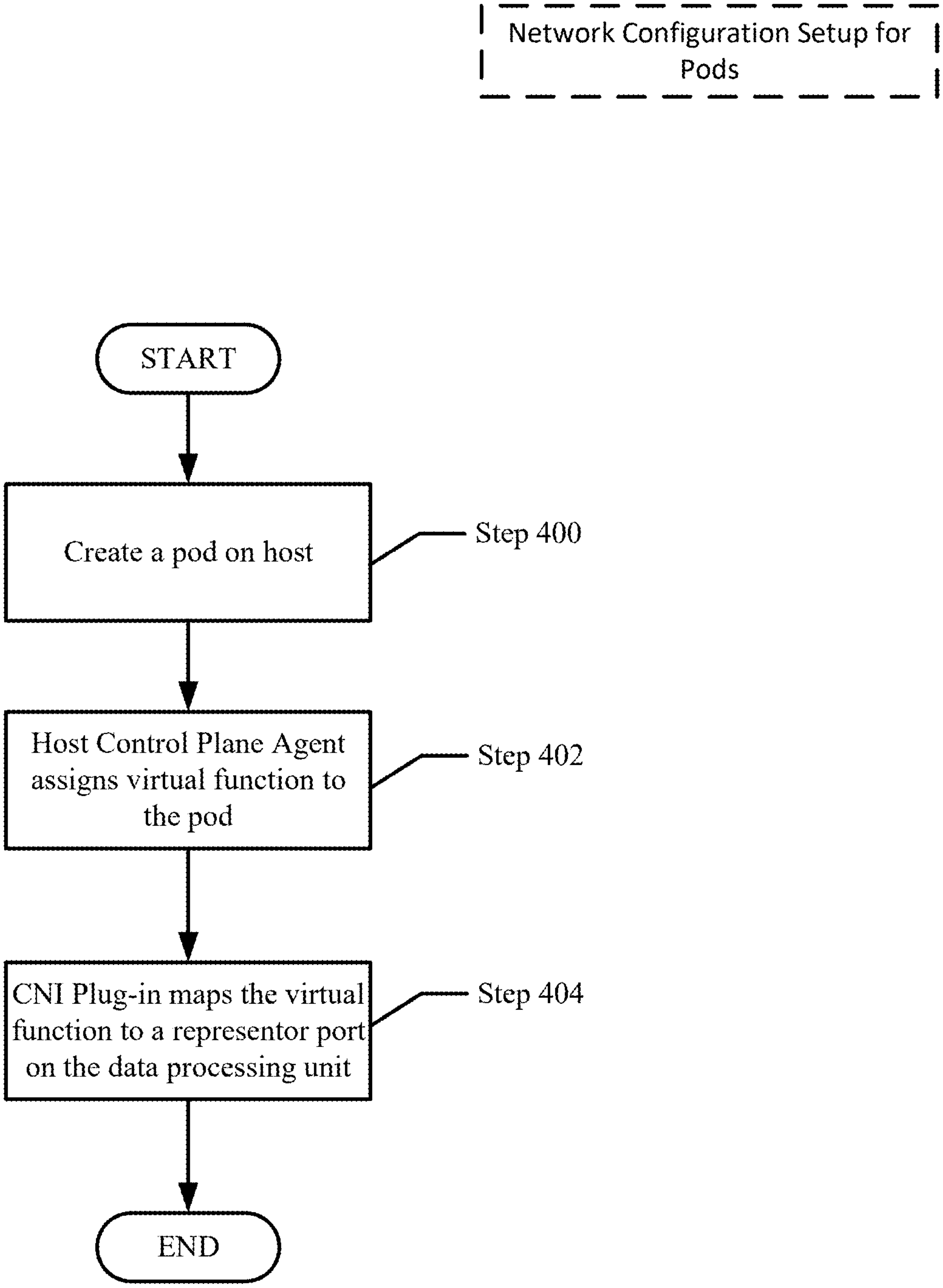
FIG. 4 shows a flowchart of a method for configuring pods in a cluster system in accordance with one or more embodiments of the invention.

FIG. 4 shows a flowchart of a method for configuring pods in a cluster system in accordance with one or more embodiments of the invention. All or a portion of the method shown in FIG. 4 may be performed by the host. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 400, a pod is created on the host by the container runtime (302).

In step 402, the host control plane plug-in (which is initiated by the CNI plug-in) assigns a virtual function to the pod.

In step 404, the CNI plug-in maps the virtual function of the pod to a representor port in the DPU.

Once the aforementioned mapping is completed, packets originating from an application (not shown) in a container (not shown) in the pod (e.g., 304A, 304E) take the following path: application A→virtual function A on pod A→mapped representor port A→packet processing components. In this manner, the packets are not processed by the processor (also referred to as the CPU) on the host. Once the packets are received by the packet processing components, the packets are processed as described in FIGS. 2.1 and 2.2. If, based on the processing, the packet is destined for an application (e.g., application B) on the host, then the packet take the following path: packet processing components→mapped representor port B→virtual function B on pod B→application B. If, based on the processing, the packet is destined for an external destination, then the packet take the following path: packet processing components→physical interface.

Selective Processing of Packets in a Cluster Architecture

In one or more embodiments of the invention, the applications within a pod executing on the host may direct packets to: (i) applications in another pod on the same system or (ii) applications (or destinations) external to the system. See e.g., FIG. 5. The embodiment shown in FIG. 3 enables all packets issued from a pod to be processed by the DPU, regardless of the ultimate destination of the packet. While the embodiment shown in FIG. 3 reduces the load on the CPU of the host, this embodiment requires all packets to be sent to the DPU via the PCIe connection(s). Depending on the network traffic, the PCIe connection(s) may become saturated and, as a result, become a processing bottleneck for packets being sent from the pods to the DPU. Embodiments of the invention address this potential PCIe bottleneck by implementing a host bridge within the host. The host bridge used to process traffic between pods on the host, while the DPU is used to process traffic between pods on the host and external destinations. In this manner, the PCIe connection(s) is only utilized for external network traffic thereby decreasing the usage of the PCIe connection(s).

Figure 5:
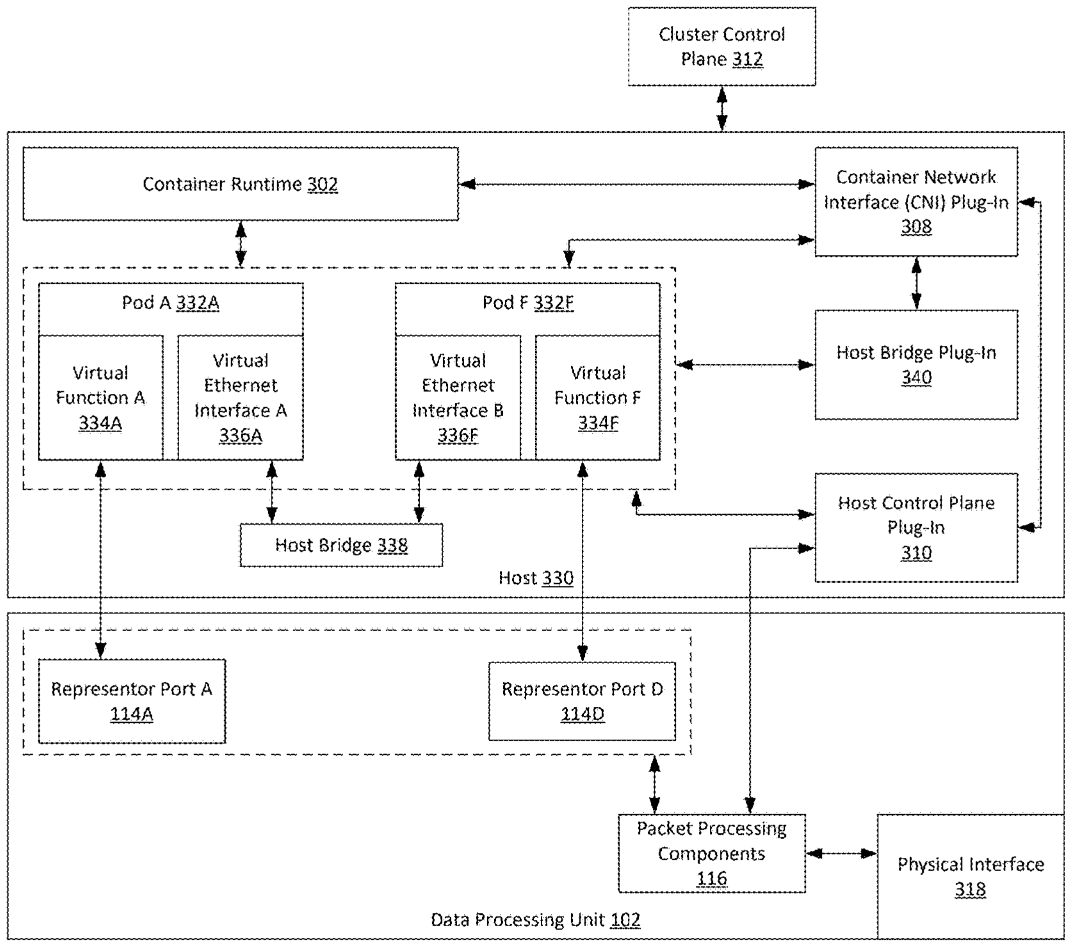
FIG. 5 shows a diagram of a cluster system in accordance with one or more embodiments of the invention.

FIG. 5 shows a diagram of a cluster system in accordance with one or more embodiments of the invention. In the following discussion, similarly named parts shown in FIG. 5 have all of the same properties and functionalities as described above in FIG. 1.1 and/or FIG. 3. Accordingly, only additional properties and functionalities are described below.

The host (330) includes pods (332A, 322F) where each of the pods includes two networking interfaces: virtual functions (334A, 334F) and virtual Ethernet interfaces (336A, 336F). The virtual functions are programmed by the host control plane plug-in and include substantially the same functionality as the virtual functions in FIG. 3.1. The CNI plug-in (308) delegates the programming of the virtual Ethernet interfaces to a host bridge plug-in (340). In addition, the host bridge plug-in also includes functionality to generate the host bridge (338). The host bridge is a process executing on the host (330) that includes functionality to manage the forwarding of packets (also referred to as L2 processing) between pods on the host.

Figure 6:
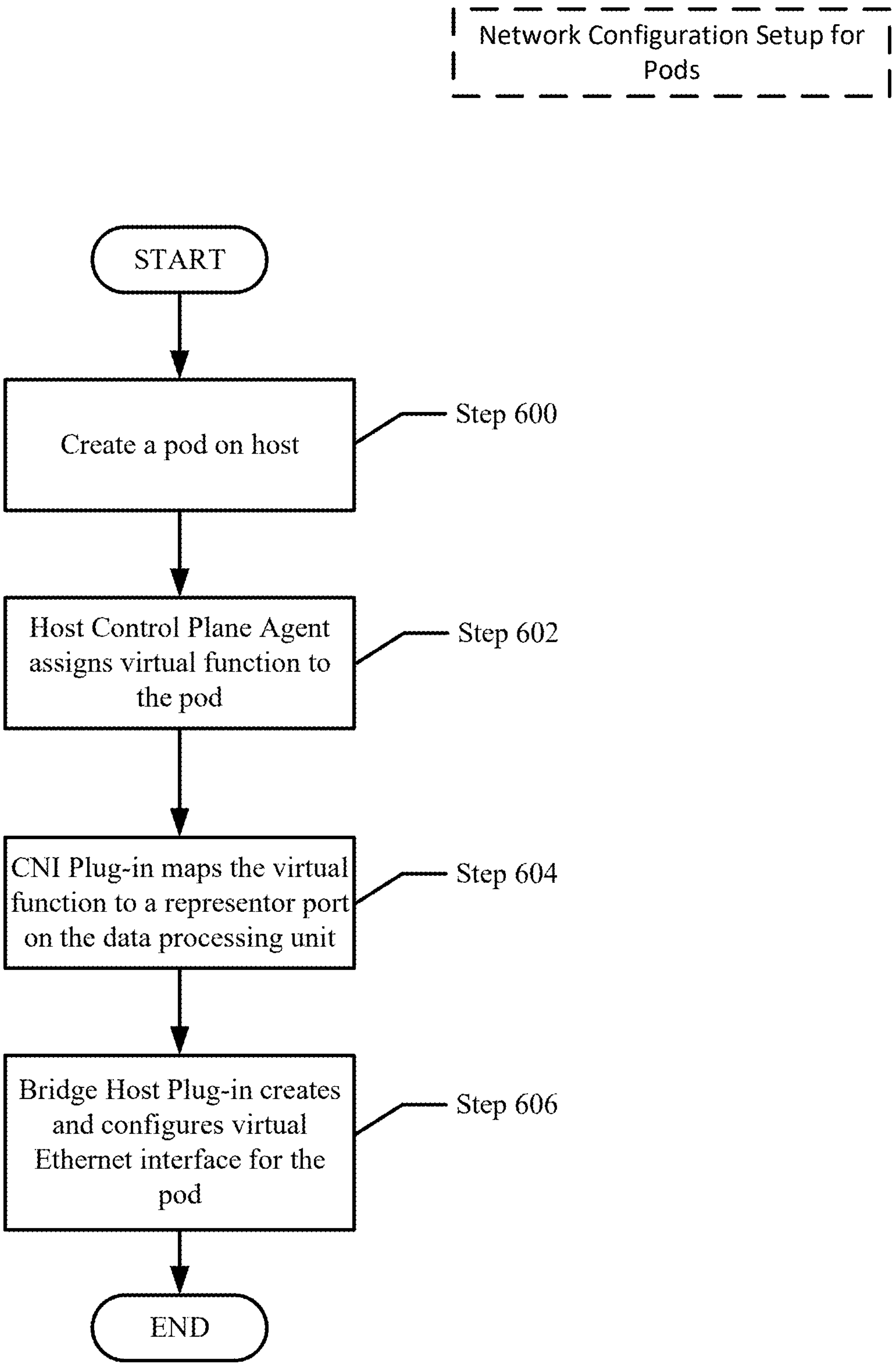
FIG. 6 shows a flowchart of a method for configuring pods in a cluster system in accordance with one or more embodiments of the invention.

FIG. 6 shows a flowchart of a method for configuring pods in a cluster system in accordance with one or more embodiments of the invention. All or a portion of the method shown in FIG. 6 may be performed by the host. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In step 600, a pod is created on the host by the container runtime (302).

In step 602, the host control plane plug-in (which is initiated by the CNI plug-in) assigns a virtual function to the pod.

In step 604, the CNI plug-in maps the virtual function of the pod to a representor port in the DPU.

In step 606, the bridge host plug-in creates and configures the virtual Ethernet interfaces on the pod.

At this stage, each pod includes at least two different networking interfaces. The packets that are transmitted out of the virtual Ethernet interfaces are processed by the host bridge (using the processor on the host) while packets that are transmitted out of the virtual function are processed using the resources on the DPU.

The applications executing on the containers can be configured to select on which networking interface to transmit packets.

If application selects a packet to be transmitted via the virtual Ethernet interface, then the packet takes the following path: application A→virtual Ethernet interface A on pod A→host bridging component→virtual Ethernet interface B on pod B→application B. In this manner, the packets are not processed by the DPU.

If application selects a packet to be transmitted via the virtual function, then the packets are transmitted as described above with respect to FIG. 5.

Figure 7:
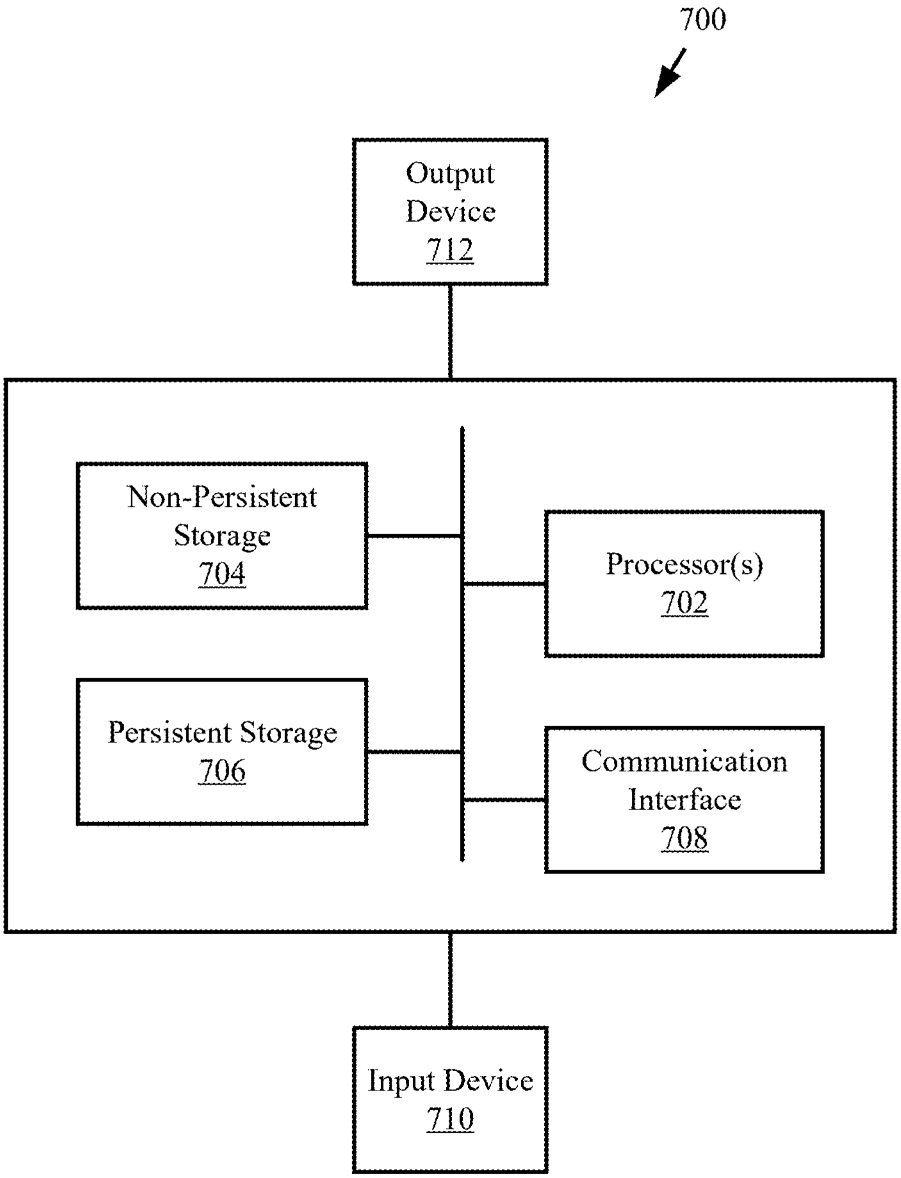
FIG. 7 shows a computing system in accordance with one or more embodiments of the invention.

FIG. 7 shows a computing system in accordance with one or more embodiments of the invention.

Embodiments of the disclosure may be implemented using computing devices. FIG. 7 shows a diagram of a computing device (700) in accordance with one or more embodiments. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), input devices (710), communication interface (708), and numerous other elements (not shown) and functionalities. Each of these components is described below.

In one embodiment, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. The communication interface (708) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (712), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (710, 712) may be locally or remotely connected to the computer processor(s) (702), non-persistent storage (704), and persistent storage (706). Many diverse types of computing devices exist, and the aforementioned input and output device(s) (710, 712) may take other forms.

Specific embodiments are above described with reference to the accompanying figures. In the above description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the above description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term ‘operatively connected’, or ‘operative connection’, means that there exists between elements/components/devices a direct or indirect connection that allows the elements to interact with one another in some way (e.g., via the exchange of information). For example, the phrase ‘operatively connected’ may refer to any direct (e.g., wired or wireless connection directly between two devices) or indirect (e.g., wired and/or wireless connections between any number of devices connecting the operatively connected devices) connection.

The problems discussed above should be understood as being examples of problems solved by embodiments of the disclosure and the disclosure should not be limited to solving the same/similar problems. The disclosed disclosure is broadly applicable to address a range of problems beyond those discussed herein.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for processing packets, comprising:

receiving a packet via a representor port on a data processing unit (DPU) operatively connected to a physical host, wherein the physical host is connected to the DPU using a Peripheral Component Interconnect Express (PCIe) connection, wherein the PCIe connection is associated with a plurality of virtual functions;

wherein the packet originated from a pod executing on the physical host, wherein the pod is associated with one of the plurality of virtual functions which is assigned to the pod using a container network interface (CNI) plug-in, wherein the CNI plug-in manages a network configuration of the pod, wherein the one of the plurality of virtual functions is mapped to the representor port by the CNI plug-in to avoid processing by a processor of the physical host, in response to receiving the packet, processing the packet using a hardware switch pipeline in the DPU, wherein the processing the packet comprises using a plurality of match/action tables to identify an exact match flow entry for the packet, wherein the plurality of match/action tables do not contain any match flow entries that are not exact match flow entries, wherein the exact match flow entries comprise/32 routes used for layer 3 (L3) processing, and wherein programming a new exact match flow entry into the plurality of match/action tables does not require reordering of any previously stored exact match flow entries; and initiating transmission of the packet towards its intended destination using the exact match flow entry.

2. The method of claim 1, wherein the plurality of match/action tables are content addressable memory tables and wherein the exact match flow entry is stored on one of the content addressable memory tables.

3. The method of claim 1, wherein the exact match flow entry is a route associated with a destination that has a specific Internet Protocol (IP) address.

4. The method of claim 1, wherein the exact match flow entry has a subnet mask of 255.255.255.255.

5. The method of claim 1, further comprising:

prior to receiving the packet, receiving a second packet by the DPU;

in response to receiving the second packet, making a first determination that there is no exact match flow entry in the hardware switch pipeline;

in response to the first determination, classifying, in the DPU, the second packet as a data packet;

in response to the classifying of the second packet:

identifying, using a software data plane in the DPU, a forwarding information base (FIB) entry to be used to transmit the second packet towards its intended destination;

identifying, using the software data plane, a flow associated with the second packet;

initiating, using the software data plane, programming of the exact match flow entry in the hardware switch pipeline; and initiating, using the software data plane, transmission of the second packet towards its intended destination using the FIB entry and the hardware switch pipeline, wherein the packet is associated with the flow.

6. The method of claim 5, further comprising:

prior to receiving the second packet, receiving a third packet by the DPU;

in response to receiving the third packet, making a second determination that there is no exact match flow entry in the hardware switch pipeline in the DPU;

in response to the second determination, classifying, in the DPU, the third packet as a control packet, wherein the control packet comprises a Border Gateway Protocol (BGP) message;

in response to the classifying of the third packet:

processing, by a control plane in the DPU, the third packet to obtain a route entry, wherein the route entry is stored in a routing information based (RIB) in the control plane, and wherein information in the route entry is subsequently stored in the software data plane in the FIB entry.

7. The method of claim 5, wherein the exact match flow entry is not programmed until the hardware switch pipeline until after the packet is received by the DPU.

8. The method of claim 5, wherein programming of the exact match flow entry in the hardware switch pipeline comprises storing the exact match flow entry in any available storage location in the hardware switch pipeline.

9. The method of claim 8, wherein the programming of the exact match flow entry does not require any reordering of any previously stored exact match flow entries in the hardware switch pipeline.

10. The method of claim 5, wherein the classifying is performed using vector packet processing (VPP).

11. The method of claim 10, wherein a host control plane plug-in executing on the physical host configures the software data plane on the DPU to perform the VPP.

12. The method of claim 11, wherein the host control plane plug-in associates the pod with one of the plurality of virtual functions.

13. The method of claim 1, wherein the pod comprises a plurality of containers, wherein the plurality of containers all use the one of the plurality of virtual functions to transmit packets.

14. The method of claim 1, wherein the intended destination of the packet is external to the physical host and the DPU.

15. The method of claim 1, wherein the intended destination of the packet a second pod executing on the physical host.

16. The method of claim 1, wherein the plurality of match/action tables are organized in a hierarchical table structure.

17. The method of claim 16, wherein the hierarchical table structure comprises a layer 2 source table, a layer 2 destination table, and a layer 3 routing flows table.

18. The method of claim 1, further comprising:

after transmitting the packet, making a determination that no packets associated with the exact match flow entry associated have been received by the hardware switch pipeline for a predetermined period of time; and initiating, in response to the determination, deletion of the exact match flow entry from the hardware switch pipeline.

19. The method of claim 18, wherein the predetermined period of time is started when the exact match flow entry is programmed into the hardware switch pipeline.

20. A method for processing packets, comprising:

receiving a packet via a representor port on a data processing unit (DPU) operatively connected to a physical host, wherein the physical host is connected to the DPU using a Peripheral Component Interconnect Express (PCIe) connection, wherein the PCIe connection is associated with a plurality of virtual functions which is assigned to the pod using a container network interface (CNI) plug-in, wherein the CNI plug-in manages a network configuration of the pod, wherein the packet originated from a pod executing on the physical host, wherein the pod is associated with one of the plurality of virtual functions, wherein the one of the plurality of virtual functions is mapped to the representor port by the CNI plug-in to avoid processing by a processor of the physical host, in response to receiving the packet, processing the packet using a hardware switch pipeline in the DPU, wherein the processing the packet comprises using a plurality of match/action tables to identify an exact match flow entry for the packet, wherein the plurality of match/action tables do not contain any match flow entries that are not exact match flow entries, wherein the exact match flow entries comprise/32 routes used for layer 3 (L3) processing, and wherein programming a new exact match flow entry into the plurality of match/action tables does not require reordering of any previously stored exact match flow entries; and initiating transmission of the packet towards its intended destination using the exact match flow entry.

* * * * *